Feb. 19, 1924.
C. F. BETZ
PASTRY CONE MACHINE
Filed Jan. 4, 1919
1,484,204
3 Sheets-Sheet 1
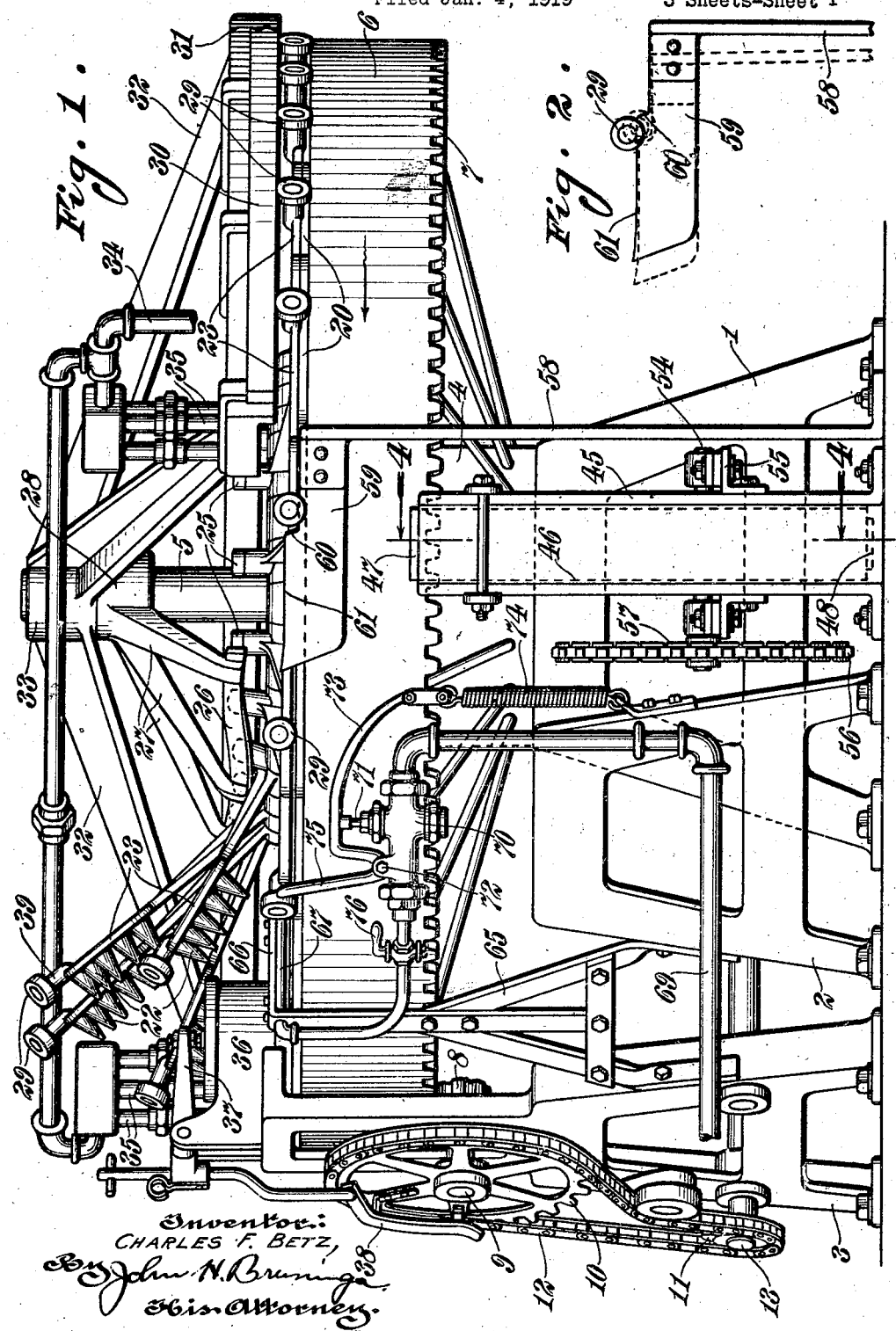

Feb. 19, 1924.  
C. F. BETZ  
PASTRY CONE MACHINE  
Filed Jan. 4, 1919  
1,484,204  
3 Sheets-Sheet 2
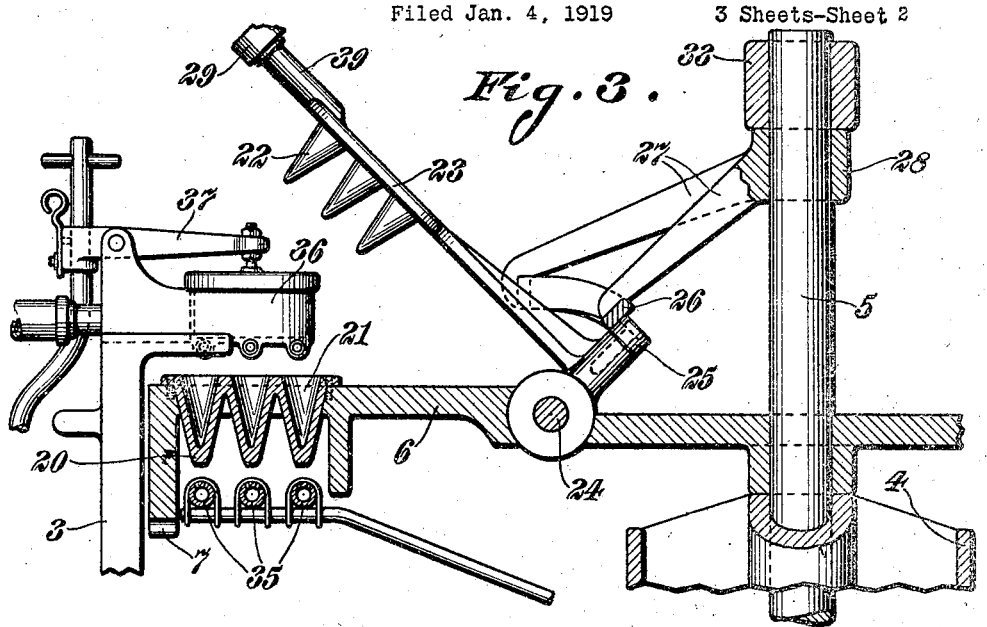
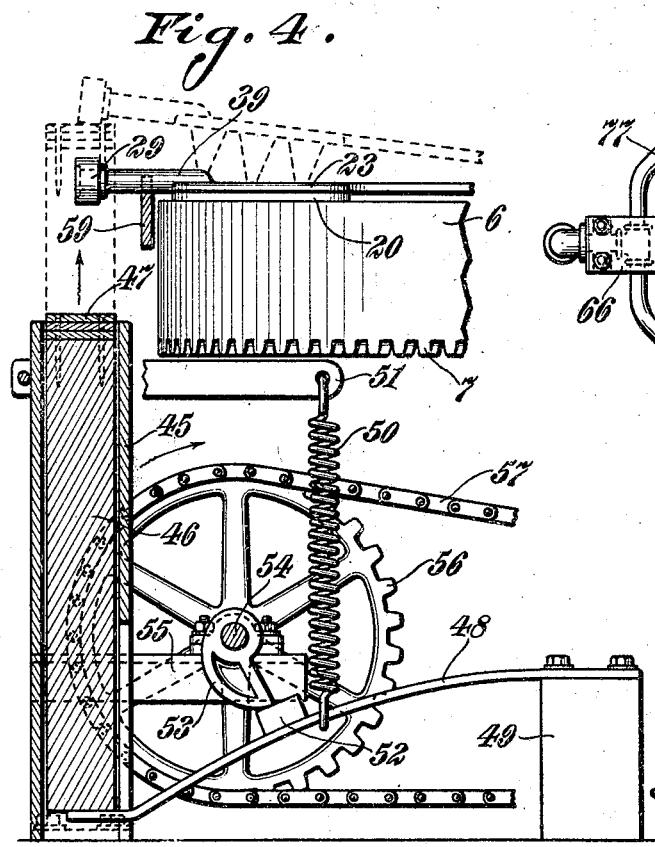
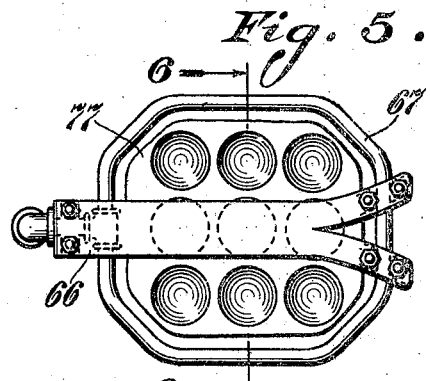
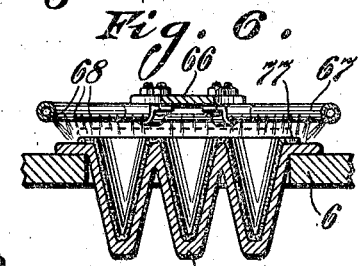
Inventor:  
CHARLES F. BETZ,  
By John H. Bruning  
His Attorney.

Feb. 19, 1924. 1,484,204

C. F. BETZ

PASTRY CONE MACHINE

Filed Jan. 4, 1919 3 Sheets-Sheet 3

Inventor:
CHARLES F. BETZ,
By John H. Bruninga
His Attorney.

Patented Feb. 19, 1924.

1,484,204

UNITED STATES PATENT OFFICE.

CHARLES F. BETZ, OF ST. LOUIS, MISSOURI.

PASTRY-CONE MACHINE.

Application filed January 4, 1919. Serial No. 269,706.

*To all whom it may concern:*

Be it known that I, CHARLES F. BETZ, a citizen of the United States, and residing at St. Louis, Missouri, have invented the new and useful Improvement in Pastry - Cone Machines, of which the following is a specification.

This invention relates to baking machines, and more particularly, to machines for making pastry cones.

In the manufacture of pastry cones, the machine generally comprises a traveling frame, having a series of molds thereon with which cooperate a series of cores, mounted on carriers. The batter is supplied to the molds by means of a suitable pastry feeding device, while the cores are separated from and clear the molds. The cores then enter the molds and press the pastry to shape and pass into an oven where the molds and the batter therein is heated to bake the same and form the baked product or article. The molds are then opened by separating the cores therefrom and the product is withdrawn.

In a machine of this type difficulty is experienced in properly removing, and more particularly, in breaking from insuring the complete removal of the baked article from the cooperating molds and cores. This is due to the fact that even with careful greasing, the baked product is liable to stick to the molds and cores, and since machines of this type are continuous in their operation, and since stopping of the machine will cause burning of the product in the oven, the operator does not have much opportunity to remove the baked product from the molds or cores. The baked product adheres closely to the mold and cores, even when properly greased, so that considerable force is necessary to break or separate the cores and molds from the baked product, so that frequent breakage occurs.

One of the objects of this invention, therefore, is to provide a machine in which the core carrier is so actuated as to separate the cores from the baked product, leaving the latter in the mold.

Another object is to provide a machine whereby the breaking or separating is accomplished by mechanism acting by the impact on the cores or the movable baking element.

Another object is to provide mechanism for separating the baked product from the mold in a simple manner without causing breakage of the product.

Another object is to provide novel locking devices for the baking elements, novel means for actuating these devices, and novel means for moving the baking elements relatively during the operation of the machine.

Further objects will appear from the detail description taken in connection with the accompanying drawings, in which:

Figure 1 is a front elevation of a machine embodying this invention;

Figure 2 is a detail of Figure 1;

Figure 3 is a detail vertical section, taken at the left of the machine, Figure 1;

Figure 4 is a section on the line 4—4, Figure 1;

Figure 5 is a detail face view of one of the molds, showing the mechanism for separating the baked product from the molds;

Figure 6 is a section on the line 6—6, Figure 5;

Figure 7:
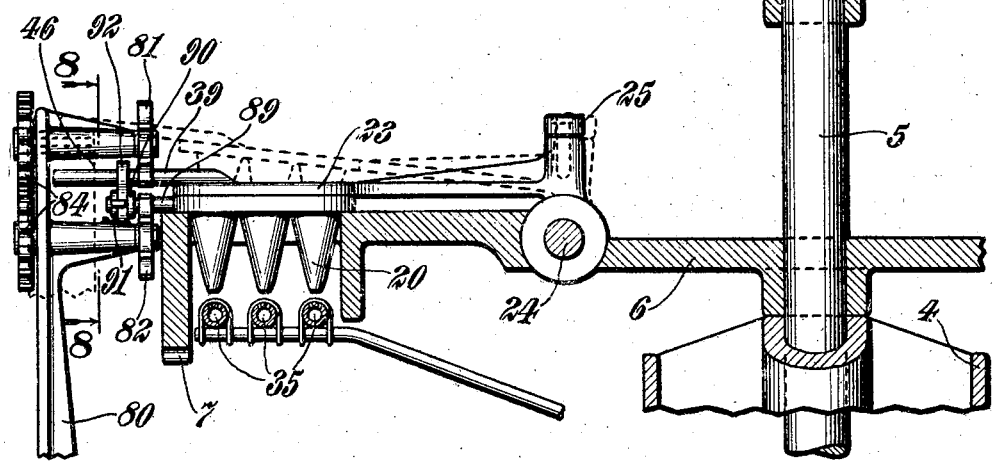
Figure 7 is a view similar to Figure 3, but showing another embodiment of this invention.

Referring to the accompanying drawings, and more particularly to Figures 1 to 4 inclusive, 1, 2 and 3 represent a series of end frames or standards which support the mechanism. The brackets 1 and 2 support a base 4 which carries a fixed vertical shaft 5. Mounted on this shaft 5 is a traveling frame 6, which is provided with a toothed rack 7, meshing with a pinion 8 on a shaft 9, supported in the bracket 3, which in turn has a sprocket 10 connected with a sprocket 11 by a chain 12, the sprocket 11 being mounted on a drive shaft 13 which is driven from any suitable source of power so as to impart a rotary movement to the traveling frame 6.

Mounted in the traveling frame 6 are a series of molds 20, which are formed to provide mold cavities 21 of conical shape, with which are adapted to cooperate a series of cores 22 on a carrier 23, there being a series of carriers, one for each mold. Each carrier is pivoted at its inner end on the traveling frame as shown at 24, and has a short arm provided with a cam roll 25, adapted to engage with a cam 26 supported by arms 27 from a hub 28 fixed to the shaft 5.

The outer end of each carrier has mounted on a shank 39 a cam roll 29 which is adapted to take under a cam face or track 30 on the bottom of an oven 31 supported by brackets 32 forming a hub 33.

It will be understood that the oven is heated by pipes (not shown) which are supplied with gas from a main supply pipe 34, and that the molds themselves are further heated by suitable gas pipes shown at 35. The bracket 3 further supports a suitable batter feeding device 36 which is actuated by a bell crank lever 37 from a cam 38 on the sprocket 10, so as to measure and deposit in each mold, as it comes below the same, a predetermined quantity of batter in each mold cavity.

The mechanism so far described is substantially the same as shown and described in Patent Number 1,281,159, granted October 8, 1918, to which reference may be had for details of construction. As described in said application, during the movement of the traveling frame, the molds with the cores cleared therefrom, as shown in Figure 3, pass successively under a batter feeding device and receive a predetermined quantity of batter. Thereafter the cam 26 permits the carriers to move down with the cores in the mold cavities as the mold moves from underneath the feeding device, and as the supplied and closed mold moves into the oven, the cam face or track 30 will engage the cam roll 29, and will firmly press the cores into the mold to form the cones. The batter is now baked while the mold passes along the oven, and the cores are then again removed from the mold cavities as each pair of cooperating baking elements leaves the oven.

*Mechanism for separating the cores from the baked product.*

Arranged at the terminus of lagging end of the oven is a guide 45, which is supported on the base or foundation of the machine, and outside of the traveling frame. In this guide moves an actuator 46, which is movable vertically in the guide, and the upper end of which is provided with a leather or other yielding facing 47, adapted to impinge on the end of each carrier as it alines therewith. The lower end of the actuator rests on the free end of the leaf-spring 48, which is fixed to a bracket 49 on the machine base and is connected with a spring 50 anchored to a bracket 51 on the guide 45. The leaf-spring has a block 52 engaged by a cam 53 fixed to the shaft 54, mounted in bearings 55 on the guide 45 and provided with a sprocket 56 which is connected by a chain 57 with another sprocket driven by the shaft 13. The gearing connecting the parts is such that the shaft 54 makes one complete revolution during each movement of a pair of baking elements through the angle between them.

A yielding support 58 is fixed at its lower end to the machine base so as to be capable of movement laterally at its upper end, and this support has mounted thereon a retaining element 59 having a shoulder 60 in the path of the shank 39 and having an upwardly inclined face 61, also in the path of the shank.

During the operation of the machine, and as each pair of cooperating baking elements move out of the oven, the shank 39 on each movable element will engage the shoulder 60 on the retaining element 59 and carry this element with it to the left, Figures 1 and 2. During the movement of these baking elements, the cam 53 will have operated to depress the leaf-spring 48, tensioning this spring and also the spring 50, and dropping the actuator 46 to its lowest position. In Figure 4, the parts are shown in a position corresponding to Figure 1, and it will be seen that the cam 53 is just about ready to release the leaf-spring 48. The parts are thus arranged that when the center of the cam roll 29 reaches the center of the actuator 46, this actuator will be released, thereby causing its spring to quickly raise it until its leather head 47 impinges on the roll 29 in the path thereof and connected with the core carrier. There will be thus imparted to the core carrier an impact blow of considerable force, which will separate the core carrier from the mold. In view of the fact that the blow is an impact blow, the movement of the core carrier is so quick that even the inertia of the baked product in the mold is sufficient to cause this baked product to lag behind, and although it will itself become partially loosened, it will remain in the mold while the cores move out and become separated from the baked product. This mechanism, therefore, insures such movement of the cores as to separate the cores from the baked product leaving the latter in the mold. Furthermore, in view of the fact, that the blow is an impact blow and delivered in one position centrally of the core carrier, there will be less strain on the machine than a slow movement caused by cam action or by lever action. In accordance with this invention a violent blow is imparted to one of the baking elements, and more particularly to the core carrier, and in a direction to not only separate this baking element or core carrier from the mold, but also separate the cores from the baked product. Furthermore, upon reference to Figure 4 it will be seen that the element 47 not only separates the baking elements, but also holds them separated, in that the element 47 does not return even by rebounding permanently to a depressed position, but it remains in elevated position and therefore holds the movable baking element or core carrier in raised position. The baked product therefore remains in the mold and does not again become attached to the cores.

As noted above, the engagement of the shank 39 with the shoulder 60 causes the retainer 59 to be placed under tension; when, however, the core carrier is raised by the impact blow of the actuator, the cam roll shank is raised above the shoulder 60 and the cam face 61 is now moved underneath the shank so that the shank will now ride on the cam face. It will further be noted that the movement of the spring 48 is such that in its highest position, the leather face 47 of the actuator is below the position of the cam roll when its shank is on the cam face 61. When, therefore, the spring 48 is released, the actuator 46 is thrown rapidly upwardly and against the cam roll, and will then immediately again drop so as to clear the cam roll.

During the further movement of the traveling frame, the cam roll shank is guided and slightly raised by the face 61, and the carrier is supported in that way with the cores partially out of the molds, until the cam roll 25 moves into engagement with the cam 26, at which time and by which means the carriers are moved upwardly to cause the cores to completely clear the mold. It will be noted, however, that at this time the cores will be entirely free from the baked product, and that the force required to move these cores to clear the mold after they have been separated from the baked product is only very slight.

*Mechanism for separating the baked product from the molds.*

Referring to Figures 1, 5 and 6, mounted on the standards 2 and 3 is an upwardly extending bracket 65 having an arm 66 extending over the traveling frame and the molds thereon, at a point along the circumference of the traveling frame where the cores have just cleared the molds. This arm supports a looped pipe 67 which forms a loop larger than the outside surface of a mold. This pipe is perforated along its lower face, the series of perforations 68 being at about an angle of 45° to the vertical so as to direct a series of air-jets against the face of the mold, as shown in Figure 6. Air is supplied to the loop under a pressure by means of a supply pipe 69, which has interposed therein a valve 70, normally closed by spring or air pressure.

The valve stem 71 is engaged by a bell crank lever pivoted at 72 on the valve casing, and one arm 73 of this bell crank lever is connected to a spring 74, anchored on the bracket 2, while an upwardly extending arm 75 is in the path of the shank 39 and the core carrier 23. The normal tension of the spring 74 is, however, such as to cause the valve 70 to remain closed. The pipe is further provided with a hand valve 76.

The batter supplied to the mold cavities is sufficient so that when the article is pressed to shape and baked, there will be formed a web 77 connecting the cones at the top, in order to permit complete removal of the set of cones from a set of mold cavities in a single mold.

During the operation of the machine, after the cores have been separated from the baked product and after these cores have been raised to clear the mold, the mold with the baked product therein will be moved underneath the looped pipe 67 to the position shown in Figures 5 and 6. Prior thereto the shank of a succeeding core carrier will have engaged the arm 75, thereby swinging the bell crank lever and raising the arm 73 from the valve stem 71 against the tension of the spring 74; upon further movement of the shank the bell crank lever will be released just as the mold moves under the loop, thereby causing the spring to return the bell crank lever, so that its arm 73 will strike the valve stem 71 and quickly open the valve 70 to admit air under high pressure to the loop. The opening of the valve is, however, for an instant only, as it closes immediately after the blow is delivered. This will cause jets of air under high pressure to be directed on the mold face at and against the faces of the web connecting the cones. This will operate by the air entering underneath the web at its edges to raise the web and with it the cones as to separate and loosen them from the molds. As the traveling frame continues in its movement, and as the mold clears the loop 67, the operator can lift a set of cones attached to the web from the mold. This, therefore, provides a simple and efficient means for loosening and separating the baked product from the molds successively without, however, breaking any of the cones, in view of the fact that the separating means is an elastic medium which applies an elastic force uniformly along the entire edge of the web.

*Résumé of operations.*

In the actual operation of the machine, assuming that the baked product has been taken from the molds, the operator will grease the mold and cores in any suitable manner and the molds will then pass underneath the batter supplying mechanism.

While the mold passes underneath this mechanism, predetermined quantities of batter will be measured and deposited in the mold cavities. As soon as the mold clears the batter feeding mechanism, the core carrier is allowed to descend to position the cores in the mold cavities, and a set of baking elements then move into the oven, the cam roll 29 passing under the end of the oven to engage the cam track 30 and press the cores down into the mold. The batter is then baked to form a cone, while the set of baking elements pass through the oven. As the set leaves the oven the separating mechanism operates to separate the cores from the baked product by an impact blow leaving the baked product in the mold, and the carrier is retained slightly separated by the retainer 59 until the cam roll on the inner end of the carrier engages the rising cam 26 which now lifts the carrier from the mold to clear the latter. As the baked product passes underneath the loop, the jets of compressed air is projected on the mold around and at the edge of the web connecting the cones, thereby loosening and separating the baked product from the mold. As the mold now clears the separating mechanism, the baked cones are taken from the mold which completes the cycle of operations.

It will, of course, be understood that in view of the fact that the baking elements are mounted in sets on a single traveling frame, the sets pass through successive cycles of operation in the same manner as heretofore described, and that each set comes into successive operation with a different mechanism heretofore described. The operation of the mechanism is, therefore, entirely automatic.

*The baking elements locking and actuating devices.*

In the operation of a pastry cone machine, it has heretofore been the practice to provide a single actuating and locking device for all of the baking elements on the traveling frame. This actuating and locking device is generally in the form of a cam as previously described, which operates to move the movable elements successively down on the molds and operates to retain them in position. Now a cam not only requires an excess of power, but it is also unreliable in that with the necessary expansion and contraction of the frame due to the application of heat, the cam path is liable to become warped so that the baking elements will not be firmly and uniformly held in engagement. Furthermore, a cam is a very inefficient device for actuating or bringing into cooperative relation the baking elements, especially where considerable pressure is required, and the alinement of the parts is, therefore, rapidly destroyed resulting in cones of ununiform side walls.

In accordance with this invention, therefore, a separate locking device is provided for each pair of cooperating baking elements, and means are provided for not only actuating the baking elements to bring them into cooperative relation, but also to engage and disengage the locking device; and this mechanism is so constructed as to operate directly and positively on the baking elements and the locking devices so as to eliminate disalinement.

Figure 8:
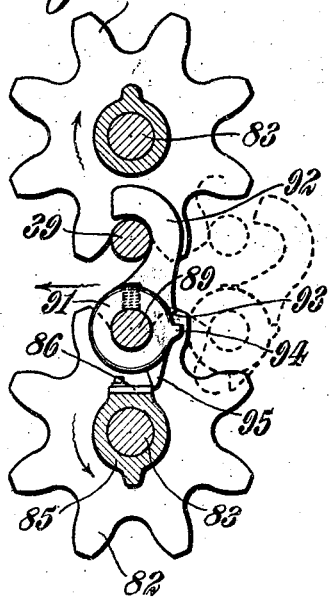
Figure 8 is a section on the line 8—8, Figure 7.
Figure 10:
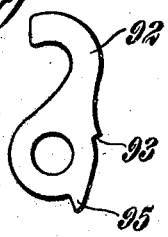
Figure 10 is a detail of the locking device.
Figure 11:
Figure 11 is a detail of the locking device retainer.
Figure 9:
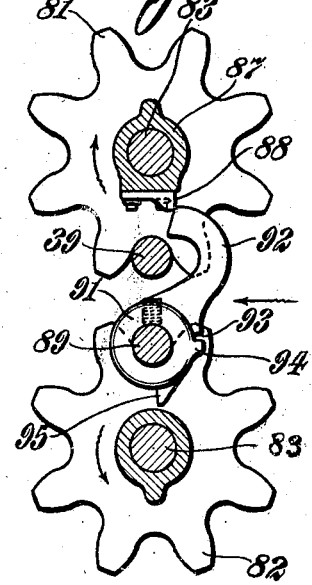
Figure 9 is a view similar to Figure 8, but taken at another point.

Referring to Figures 7 to 11 inclusive, the traveling frame 6, the mold 20, the core carriers 23 and their cores, the cam 26, and the carrier shank 39 and the cam roll 25 are substantially of the same construction, and their operation is substantially the same, as in the embodiment heretofore described. There is also provided in this embodiment the actuating and retaining mechanism as well as the batter feeding mechanism, together with the pneumatic means for separating the baked product from the mold as heretofore described. In this case, however, the cam track 30 on the oven and the cam roll 29 on the core carrier shank are dispensed with.

Supported on the base of the machine is a pair of brackets 80 one bracket being positioned at the terminus of the oven, and slightly to the right of the support 58 (Figure 1) and the other being supported at the entrance of the oven. Each of these brackets has mounted thereon a pair of gears 81 and 82, the shafts 83 of which extend through the brackets and may be provided with intermeshing gears 84. The lower boss 85 (Figure 8) on the bracket at the entrance of the oven has mounted thereon a hardened plate or stop 86, while the upper boss 87 on the bracket at the terminus of the oven has mounted thereon a hardened plate or stop 88. Attached to each mold is a shank 89 which projects radially from the traveling frame and extends parallel to the shank 39 on the core carrier, which, however, projects beyond the shank 89. Mounted on the end of each shank 89, and between the pair of collars 90 and 91 fixed to the shank 89, is pivotally mounted a locking device 92 which has a hook adapted to take over the shank 39. The end of this hook is adapted to engage the stop 88, while the movement of the locking device is limited by the engagement of the shoulder 93 thereon with a laterally projecting lug 94 on the collar 91. The locking device 92 has a tail 95 adapted to engage the stop 86.

Assuming the traveling frame 6 to move from right to left, and assuming that the locking device connecting a pair of baking elements is in engagement with the hook on the shank 39, as these baking elements leave the oven, the shanks 39 and 89 will move into mesh with the gears 81 and 82 until the end of the hook strikes the stop 88. Further movement of the traveling frame will cause the hook to disengage the shank 39, thereby unlocking the movable baking elements 23. As the shank 39 comes into alinement with the actuator, this actuator is released as heretofore described, striking the shank with a hammer blow and separating the cores from the baked product in the mold. As the traveling frame continues in its movement, the retainer 59 will operate to partially raise the core carrier, the cam 26 will operate to completely raise this core carrier to clear the mold, the pneumatic mechanism will operate to separate the baked product from the mold, the batter feeding mechanism will deposit predetermined quantities of batter in the mold, and the cam 26 will permit the core carrier to drop to position the cores in the mold. After this the shanks 39 and 89 come into mesh with the gears 81 and 82 positioned at the entrance of the oven, and the meshing engagement with the shank 39 with the upper gear 81 (which is intermeshed with and driven in unison with the gear 82, moved by the shank 89, connected with the mold) will cause the shank 89 to be positively depressed to firmly force the core carrier down on the mold; furthermore, the tip of the tail 95 of the locking device will now engage the stop 86 thereby moving the hook of the shank 39 so as to firmly lock the cooperating baking elements in cooperative relation, the movement of the tail tip through the arc of a circle causing the same to clear and slide over the stop upon further movement of the mold. This leaves the cooperating baking elements firmly locked together as it passes into and along the oven, so that these baking elements will be individually locked through their entire movements through the oven. As the baking elements leave the oven, they are ready to be unlocked, thereby completing the cycle of operations.

In accordance with this invention, therefore, each cooperating pair of baking elements has a separate locking device, so that the baking elements are individually locked against relative movement during the entire baking operation. This insures the formation of an uniformly baked product. The locking and unlocking of the baking elements is, however, entirely automatic and this is accomplished by one set of mechanisms positioned at the respective ends of the oven. In view of the fact that the baking elements are pressed together by a pair of gears, which are interconnected, and in view of the fact that the upper gear engaging the movable baking element is driven from a short shank connected with the cooperating baking element, a positive compressing movement is obtained without resorting to the usual cams, which disturb the alinement by the sidewise pressure on the movable element. There is in fact practically no sidewise movement at all on the movable element, in view of the fact that the gearing is essentially a rolling contact device. The gearing for disengaging the gears 81 and 82 (Figure 9) operates to press the baking elements together somewhat before the locking device is disengaged, so that this locking device will not wear out and can overhang slightly, in view of the fact that the distance between the shanks 39 and 89 when in the position shown in Figure 8 can be slightly less than their distance when locked together.

The method of making pastry cones is not claimed in this application but is claimed in application Serial Number 309,851, filed July 10, 1919, copending with this application.

It is obvious that various changes may be made in the details of construction without departing from the spirit of this invention. It is to be understood that this invention is not to be limited to the specific construction shown and described.

Having thus described the invention, what is claimed is:

1. In a machine of the class described, the combination with a pair of cooperating baking elements, of mechanism for imparting a violent blow to one of said baking elements and in a direction to separate it from the other element.

2. In a machine of the class described, having a pair of cooperating baking elements, the employment of separating mechanism therefor, comprising, an actuator, and means for moving said actuator, adapted to cause it to impart a violent blow to one of said baking elements and in a direction to separate it from the other baking element.

3. In a machine of the class described having a pair of cooperating baking elements, the employment of separating mechanism therefor, comprising, an actuator, means for tensioning said actuator, and means for releasing said actuator, adapted to cause it to impart a violent blow to one of said baking elements and in a direction to separate it from the other baking element.

4. In a machine of the class described, the combination with a mold, of cores cooperating therewith, a core carrier, and mechanism for imparting a violent blow to said carrier and in a direction to separate the cores from said mold.

5. In a machine of the class described, the combination with a traveling frame, of a series of sets, of relatively movable baking elements thereon, and separating mechanism arranged adjacent said frame and adapted to successively impart a violent blow to each of the movable of said elements and in a direction to successively separate the elements of a set.

6. In a machine of the class described, the combination with a pair of relatively movable cooperating baking elements, of means for imparting a violent blow to one of said baking elements and in a direction to separate said elements, and means engaging said movable element when separated, adapted to maintain it in separated position.

7. In a machine of the class described, the combination with a pair of relatively movable cooperating baking elements, of means for imparting a violent blow to the movable of said elements, adapted to separate said elements and hold them separated.

8. In a machine of the class described, the combination with a traveling frame, of a series of sets of relatively movable baking elements thereon, means arranged adjacent said frame for successively imparting a violent blow to each of the movable of said elements and in a direction to separate said elements, and means operated upon separation of an element, adapted to maintain the latter in separated position.

9. In a machine of the class described, the combination with a traveling frame, of a series of sets of relatively movable baking elements thereon, and means arranged adjacent said frame for successively imparting a violent blow to the movable of said elements, adapted to separate said elements and hold them separated.

10. In a machine of the class described, the combination with a traveling frame, of a pair of relatively movable cooperating baking elements thereon, and gearing arranged in the path of the movable of said elements, adapted to close said elements.

11. In a machine of the class described, the combination with a traveling frame, of a pair of relatively movable cooperating baking elements thereon, and a pair of gears arranged in the path of said elements adapted to close said elements.

12. In a machine of the class described, the combination with a traveling frame, of a pair of relatively movable cooperating baking elements thereon, a locking device for said elements, gearing arranged in the path of said elements, adapted to move said elements relatively, and means cooperating with said gearing, adapted to actuate said device.

13. In a machine of the class described, the combination with a traveling frame, of a pair of relatively movable cooperating baking elements thereon, a locking device carried by one of said elements and adapted to engage the other element, gearing arranged in the path of said elements, adapted to move said elements relatively, and means cooperating with said gearing, adapted to actuate said device.

14. In a machine of the class described, the combination with a baking mold, of means for directing an air blast at the edge of the baked product, adapted to separate the latter from the mold.

15. In a machine of the class described, the combination with a baking mold, of means for directing an air blast on the mold at the edge of the baked product, adapted to separate the latter from the mold.

16. In a machine of the class described, the combination with a baking mold, of means for directing an air blast on the mold and in a direction against the edge of the baked product, adapted to separate the latter from the mold.

17. In a machine of the class described, the combination with a baking mold, of means for directing an air-blast on and at an angle to the mold and in a direction against the edge of the baked product, adapted to separate the latter from the mold.

18. In a machine of the class described, the combination with a mold adapted to form a series of baked articles connected by a web, of means for directing an air blast at the edge of the web, adapted to separate the article from the mold.

19. In a machine of the class described, the combination with a mold adapted to form a series of baked articles connected by a web, of means for directing an air blast on the mold face and at the edge of the web, adapted to separate the article from the mold.

20. In a machine of the class described, the combination with a baking mold, of a separating device encircling the mold, and means on said device arranged to direct air under pressure at and along the edge of the baked product, adapted to separate the latter from the mold.

21. In a machine of the class described, the combination with a traveling frame, of a series of baking molds thereon, and means adjacent said frame and in the path of said molds, arranged to direct an air blast successively at the edge of the baked product in each mold, adapted to separate the baked product from the mold.

22. In a machine of the class described, the combination with a traveling frame, of a series of baking molds, thereon, and means adjacent said frame and in the path of but above said molds, arranged to direct an air blast at the edge of the baked product in each mold as it passes thereunder, adapted to separate the baked product from the mold.

In testimony whereof I affix my signature this 22 day of August 1918.

CHARLES F. BETZ.